United States Patent
Geiger et al.

(10) Patent No.: US 12,413,473 B1
(45) Date of Patent: *Sep. 9, 2025

(54) DISCOVERING COMPUTING ENTITIES COMMUNICATING WITH A NETWORK COMMUNICATION PROTOCOL

(71) Applicant: Qintel, LLC, Pittsburgh, PA (US)

(72) Inventors: Matthew Karl Geiger, Austin, TX (US); Philip Furrie Burdette, Wexford, PA (US)

(73) Assignee: Qintel, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,890

(22) Filed: Jun. 5, 2024

Related U.S. Application Data (63) Continuation of application No. 17/825,633, filed on May 26, 2022, now Pat. No. 12,028,214.

(51) Int. Cl.
| | |
|---|---|
| *G06F 15/173* | (2006.01) |
| *H04L 41/0893* | (2022.01) |
| *H04L 41/12* | (2022.01) |
| *H04L 43/10* | (2022.01) |
| *H04L 67/08* | (2022.01) |

(52) U.S. Cl.
CPC ......... *H04L 41/0893* (2013.01); *H04L 41/12* (2013.01); *H04L 43/10* (2013.01); *H04L 67/08* (2013.01)

(58) Field of Classification Search
CPC ..... H04L 67/08; H04L 41/0893; H04L 41/12; H04L 43/10
See application file for complete search history.

(56) References Cited

U.S. PATENT DOCUMENTS

| | | |
|---|---|---|
| 10,027,705 B1 | 7/2018 | Coleman et al. |
| 10,764,313 B1 | 9/2020 | Mushtaq |
| 12,028,214 B1 * | 7/2024 | Geiger ............... H04L 67/08 |
| (Continued) | | |

FOREIGN PATENT DOCUMENTS

WO    WO2013165368 A1    11/2013

OTHER PUBLICATIONS

Sandra Smith et al., "Modeling and Verifying Security Protocols Using UML 2", 2011 IEEE International Systems Conference, 2011, 8 pages, IEEE.

*Primary Examiner* — Yves Dalencourt
(74) *Attorney, Agent, or Firm* — FERENCE & ASSOCIATES LLC (57) ABSTRACT

One embodiment provides a method for discovering an entity communicating using a network communication protocol. A scanning system of a system transmits, at a plurality of communication ports, a message using the network communication protocol to elicit a response from an entity accessing one of the communication ports. The transmitting includes emulating a portion of the network communication protocol. The scanning system receives a response to the message from the entity accessing one of the communication ports. The scanning system determines the entity is an entity of interest by determining that the response is provided using the network communication protocol and is responsive to the message. Responsive to determining that the entity is an entity of interest, the entity is added to a group of entities of interest.

20 Claims, 3 Drawing Sheets

(56) References Cited

U.S. PATENT DOCUMENTS

| | | |
|---|---|---|
| 2004/0075642 A1* | 4/2004 | Kisliakov ............. G06F 1/1684 345/156 |
| 2012/0331556 A1 | 12/2012 | Alperovitch et al. |
| 2016/0234167 A1 | 8/2016 | Engel et al. |
| 2017/0201537 A1 | 7/2017 | Caldwell et al. |
| 2018/0191779 A1 | 7/2018 | Shieh et al. |
| 2018/0227172 A1* | 8/2018 | Hamber ............. H04L 12/6418 |
| 2022/0067146 A1 | 3/2022 | Cai et al. |
| 2022/0225101 A1 | 7/2022 | Fellows |
| 2022/0311705 A1 | 9/2022 | Thubert et al. |
| 2022/0400523 A1 | 12/2022 | Kopchinsky et al. |
| 2022/0413943 A1 | 12/2022 | Poornachandran et al. |
| 2022/0417143 A1 | 12/2022 | Thubert et al. |

* cited by examiner

DISCOVERING COMPUTING ENTITIES COMMUNICATING WITH A NETWORK COMMUNICATION PROTOCOL

CROSS REFERENCE TO RELATED APPLICATION

This application is a continuation application of co-pending U.S. patent application Ser. No. 17/825,633, filed May 26, 2022, entitled "DISCOVERING COMPUTING ENTITIES COMMUNICATING WITH A NETWORK COMMUNICATION PROTOCOL," the content of which is incorporated herein by reference as if set forth in its entirety.

BACKGROUND

Computing systems provide many different functions and are an integral part of life, particularly for companies and other entities that need processing capabilities. However, computing systems are vulnerable to misuse and attacks, particularly those computing systems that are connected to external networks, for example, the Internet, cloud networks, remote networks, networks belonging to other entities, and the like. The external connection that is required to communicate outside the entity hosting the computing system allows a connection for another actor to gain access to and communicate with the computing system. As entities become aware of actors attempting to communicate with a system, the entity may take action to prevent the communication. If the actors are motivated, they may change the way the communications occur to gain access again while preventing the entity from identifying that the actor is again attempting to gain access to the computing system. Thus, attempting to identify and prevent unwanted communications with a system requires an ability to identify communication protocols utilized by the unwanted entity.

BRIEF SUMMARY

In summary, one aspect provides a method for discovering an entity communicating using a network communication protocol, the method including: transmitting, at a plurality of communication ports and utilizing a scanning system, a message using the network communication protocol to elicit a response from an entity accessing one of the communication ports, wherein the transmitting includes emulating a portion of the network communication protocol; receiving, at the scanning system, a response to the message from the entity accessing one of the communication ports; determining, using the scanning system, the entity is an entity of interest by determining that the response is provided using the network communication protocol and is responsive to the message; and adding, responsive to determining that the entity is an entity of interest, the entity to a group of entities of interest.

Another aspect provides a system for discovering an entity communicating using a network communication protocol, the system including: a scanning module; a processor operatively coupled to the scanning module; a memory device that stores instructions that, when executed by the processor, causes the system to: transmit, at a plurality of communication ports and utilizing the scanning system, a message using the network communication protocol to elicit a response from an entity accessing one of the communication ports, wherein the transmitting includes emulating a portion of the network communication protocol; receive, at the scanning system, a response to the message from the entity accessing one of the communication ports; determine, using the scanning system, the entity is an entity of interest by determining that the response is provided using the network communication protocol and is responsive to the message; and add, responsive to determining that the entity is an entity of interest, the entity to a group of entities of interest.

A further aspect provides a product for discovering an entity communicating using a network communication protocol, the product including: a computer-readable storage device that stores executable code that, when executed by a processor, causes the product to: transmit, at a plurality of communication ports and utilizing a scanning system, a message using the network communication protocol to elicit a response from an entity accessing one of the communication ports, wherein the transmitting includes emulating a portion of the network communication protocol; receive, at the scanning system, a response to the message from the entity accessing one of the communication ports; determine, using the scanning system, the entity is an entity of interest by determining that the response is provided using the network communication protocol and is responsive to the message; and add, responsive to determining that the entity is an entity of interest, the entity to a group of entities of interest.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Communications by an entity, particularly those that are unwanted and are being purposely hidden, are difficult to identify because the communication protocol being utilized by the entity has to be known. For readability, the entity providing the communications to a system will be referred to as the target entity. Many target entities, particularly those with nefarious or malicious purposes, will create a unique network communication protocol for the communications into the system. This unique network communication protocol then has to be learned by a scanning system that is attempting to identify the target entity as an entity of interest. Additionally, even if scanning system knows that the protocol exists, the scanning system must know enough of the protocol to be able to elicit a response from the target system, thereby confirming the target system is utilizing the protocol. Since many different entities and systems communication with many different communication protocols, it is difficult to stay up-to-date with new protocols. Additionally, it is difficult to learn the protocols to an extent that allows the scanning system to elicit a response from the target system.

Conventional scanning systems are programmed with known communication protocols. Thus, when new protocols are created and utilized by a target entity, the conventional scanning system will not know the new protocol and will be unable to detect an entity utilizing the new protocol. In other words, the conventional scanning systems do not have a way to identify new protocols, determine whether the protocol belongs to an entity of interest, and, if the protocol does belong to an entity of interest, learn enough of the protocol to elicit a response from the entity of interest. Accordingly, until the conventional scanning systems are updated with new protocols, target entities utilizing the new protocols will go unnoticed by the conventional scanning systems. Additionally, conventional scanning systems announce their presence when scanning for target entities which allows a target entity to easily block or misdirect the scanning system from discovering the target entity.

Accordingly, the described system and method provides a technique for discovering, using a scanning module of a computing system, a computing entity that is communicating using a network communication protocol. The scanning system, which may be a scanning module or may be larger system that includes a scanning module, transmits, at a plurality of communication ports, a message using the network communication protocol. The message is designed to elicit a response from an entity that may be communicating utilizing the network communication protocol, referred to as the target entity. Since the scanning module is attempting to elicit a response from the target entity, the transmitted message will be formatted in view of the network communication protocol. In other words, when transmitting the message, the scanning module emulates the network communication protocol so that a target entity will respond.

While the network communication protocol may be a known network communication protocol, it may also be unknown. In the case that the protocol is unknown, the scanning system obtains a piece of the entity, for example, a portion of the unknown network communication protocol, a sample of software of the target entity, or the like. From this piece, a user can reverse engineer the protocol and provide the protocol to the scanning system. The scanning system generates at least a portion of the protocol that is used to create and transmit the message.

From a target entity that is utilizing the network communication protocol and that is accessing one of the communication ports, the scanning module receives a response to the message. The scanning module determines whether the entity is an entity of interest by determining that not only is the response provided using the network communication protocol, but also that the response is actually responsive to the message that was transmitted. Upon determining that the entity is an entity of interest, or a target entity, the entity is added to a group of entities of interest. This group may then be provided as a list or other output to a user and the user may take actions with respect to the target entities. The scanning system may also be programmed to take automatic actions that do not require user input.

Therefore, a system provides a technical improvement over traditional methods for scanning for target entities. The described system and method provide a technique that is able to identify new or unique communication protocols that are used by target entities. New or unique communication protocols are those that are not previously known to scanning systems. Unlike conventional scanning systems that are unable to identify new communication protocols, determine whether an unknown protocol belongs to an entity of interest, and learn the unknown protocol, the described system and method is able to identify new communication protocols, determine whether these protocols belong to entities of interest, and, if so, learn at least enough of the protocol to be able to elicit a response from a target entity utilizing the protocol. This allows the described scanning system to more accurately identify target entities and also more quickly identify target entities than conventional scanning systems.

Additionally, the described system and method is able to communicate using the protocol in a manner that obscures the identity and/or any identifying features or attributes of the scanning system from the target system so that the scanning system cannot be easily blocked or misdirected by the target system. Thus, the described system and method provides a scanning system that is better and quicker at identifying target entities, particularly, those target entities that are employing previously unknown communication protocols. Additionally, the described system can scan for target entities at a large scale.

The illustrated example embodiments will be best understood by reference to the figures. The following description is intended only by way of example, and simply illustrates certain example embodiments.

Figure 1:
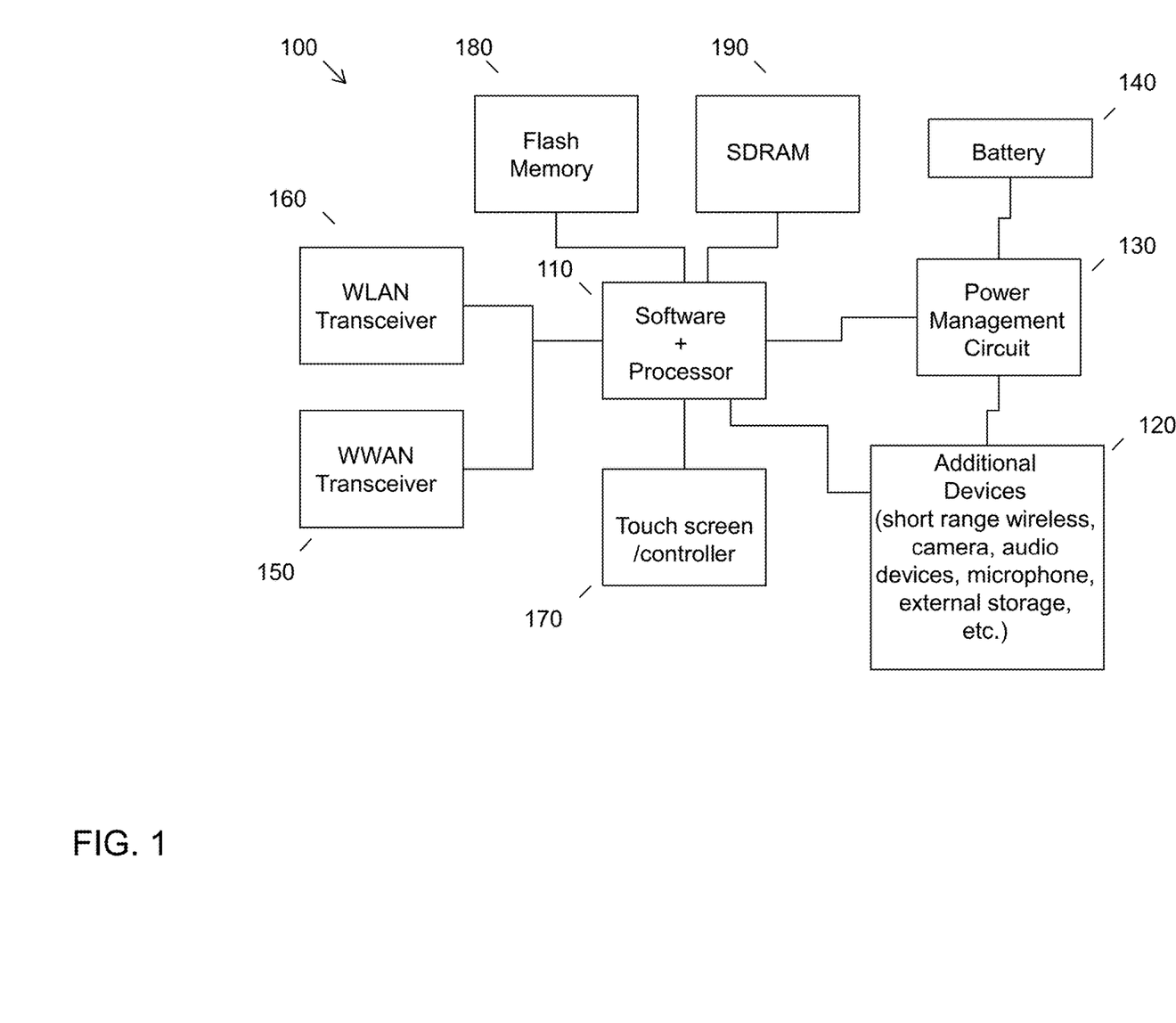
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
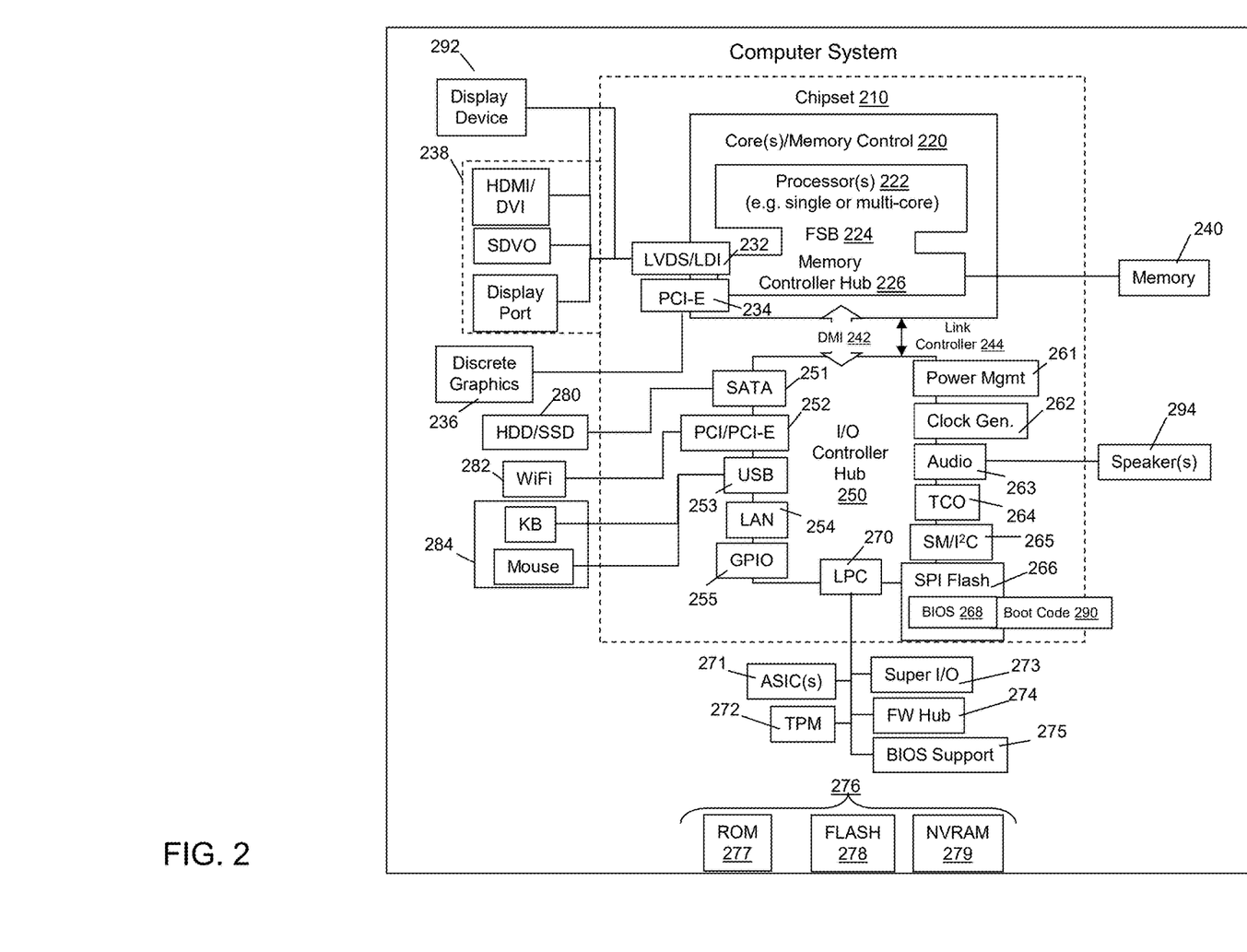
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems for discovering an entity using a network communication protocol as described herein and/or in entities using a network communication protocol. For example, the circuitry outlined in FIG. 1 may be implemented in a tablet or smart phone embodiment, whereas the circuitry outlined in FIG. 2 may be implemented in a personal computer embodiment.

Figure 3:
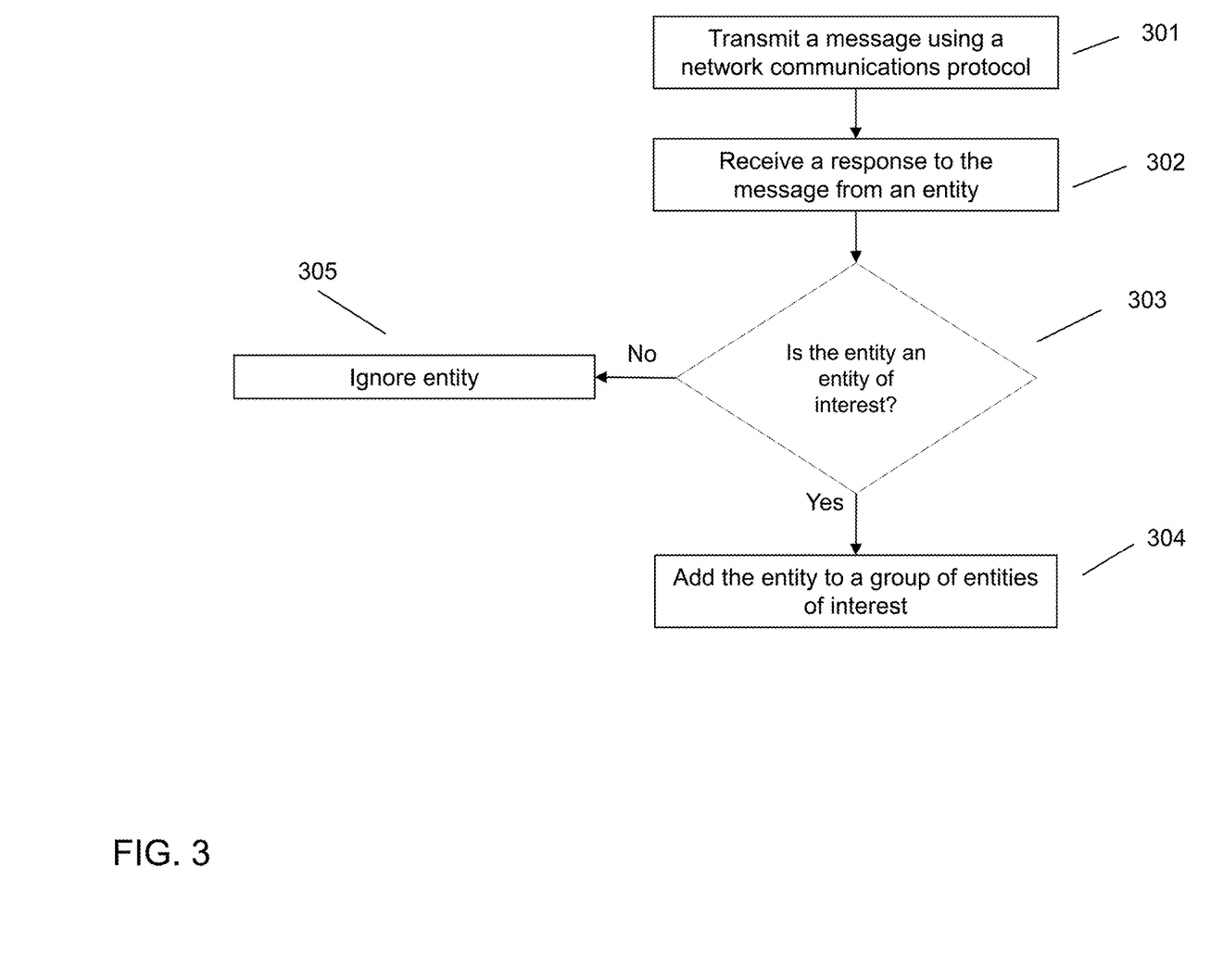
FIG. 3 illustrates an example method for discovering, using a scanning module of a computing system, a computing entity that is communicating using a network communication protocol.

FIG. 3 illustrates an example method for discovering, using a scanning module of a computing system, a computing entity that is communicating using a network communication protocol. The method may be implemented on a system which includes a processor, memory device, output devices (e.g., display device, printer, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the system itself is specifically programmed to perform the functions as described herein to discover entities communicating using a network communication protocol. Additionally, the scanning system includes modules and features that are unique to the described system.

The described system includes a scanning system which may be a single scanning module or may be one or more scanning modules and accompanying framework and infrastructure. The scanning system is deployed to scan ports that can be used to allow communication into a system, for example, ports that allow the system to perform external communications. Additionally, since not all target entities may originate from outside an entity or organization, the scanning system can also scan communication ports that do not allow external communication. The scanning system scans the communication ports looking for communications that are provided by entities that are of interest to the scanning system. Generally, entities of interest, or target entities, are those that represent threats or some kind of significant influence on a system. For example, a target entity may be an entity launching an attack or other malicious activity on a system. The scanning system scans for a particular communication protocol utilized by the target system to identify an entity as a target entity.

To scan for a target entity that communicates using a particular network communication protocol, the scanning system, at 301, transmits, at a plurality of communication ports, a message, which may include more than one message, that is designed to elicit a response from a target entity that is accessing one of the communication ports. The scanning system may transmit a message at a single communication port at a time or may transmit one or more messages at a plurality of communication ports simultaneously, or a combination thereof. The message(s) that is transmitted at one communication port may be the same message(s) that is transmitted at another of the communication ports or may be different messages. Additionally, the same message(s) may be transmitted at more than one communication port and another message(s) is transmitted at another set of communication ports.

In order to elicit a response, the scanning system emulates a portion of the network communication protocol. In other words, the message transmitted by the scanning system is formatted in view of and uses the language of the network communication protocol in order to elicit a responsive response to the message from an entity that utilizes the network communication protocol. An example message type is a question that is generated using the protocol. A responsive response from a target entity would be an answer to the question. Another example message type is a request that is generated using the protocol. A responsive response from a target entity would be a response fulfilling the request. Other message types may be used and are contemplated and the identified message types are merely illustrative examples.

When emulating the protocol, the scanning system configures a format and attributes of the message to match the network communications protocol. In other words, in order to accurately emulate the protocol, not only may the "words" of the message need to follow a particular format, but other portions of the message may need to be formatted or mal-formatted in a particular manner to elicit a response from a target entity. Some example attributes that may need to be configured include, but are not limited to, a hypertext transfer protocol (HTTP) header, uniform resource locators (URLs), port combinations, overall message format, and the like. The scanning system may also configure some of the message format and attributes so that the interactions of the scanning system are not logged or recorded by the target entity. In other words, even if the protocol does not require one or more attributes or the format to be configured in a particular manner, the scanning system may configure these attributes or format portions in order to hide the scanning system from the target entity. Similarly, the scanning system may change or remove attributes that would identify the scanning system.

The scanning system may know the entire network communication protocol or may only know a portion of the network communication protocol. In the case that the scanning system only knows a portion of the network communication protocol, the known portion is at least enough to emulate the network communication protocol in such a manner that would elicit a response from a target entity communicating using the same network communication protocol. Since each network communication protocol is different, the amount of the network communication protocol that has to be known to elicit a response can be different across different protocols. Accordingly, there is not a specific amount of the protocol that must be known or that can be defined. Rather, the amount known is based upon whether the known portion would be enough to elicit a response from a target entity.

Additionally, even if the scanning system knows the entire protocol or knows more than what would be required to elicit a response, the portion transmitted at the communication ports may be less than what is known by the scanning system. The scanning system may choose to only transmit a portion less than what is known for one or more reasons. One reason is that implementing only a portion of the protocol can make it quicker and more efficient to identify target entities. This is particularly true if the selected portion would elicit a response that is distinctive and the scanning system has a high confidence that an entity providing a responsive response to the message is a target entity. Another reason to only implement a portion of the protocol is to obscure the fact that the scanning system is probing the target entity. In other words, by only utilizing a portion of the protocol when transmitting the message may reduce the likelihood that the person running the controller or target entity is alerted to the fact that the scanning system is probing the controller. Nonetheless, the portion of the protocol that is emulated at 301 may be the entire protocol or may be a fraction of the protocol.

Some target entities may attempt to access systems at a particular time, within a particular time frame, at particular time intervals, from a particular geographical location, within a particular geographical location, and the like. Accordingly, the transmitting of the message may be performed in view of user-provided communication parameters. The scanning system may also learn or have default communication parameters and the transmission of the messages may be performed in view of these communication parameters. For example, the scanning system may employ a learning algorithm, machine-learning model, deep-learning model, or other artificial intelligence algorithm that allows the scanning system to learn information about a target entity. The learned information can be ingested by the artificial intelligence algorithm to further refine the algorithm. The algorithm can be employed to make predictions or decision regarding the communication parameters. The communication parameters may include, but are not limited to, transmission at a particular time or time frame, transmission from a particular geographical location or appearance that the transmission is originating from a particular geographical location, transmission from or to a particular communication port, or the like. The parameters may be customized based upon a number of different factors.

Since target entities may create their own unique network communication protocol, the scanning system may need to identify the protocol and learn enough of the protocol to emulate the protocol. In this case, the scanning system may identify an entity having an unknown network communication protocol. This identification may work in conjunction with a user or other modules of the scanning system or infrastructure including the scanning system. For example, the system may utilize a module that can extract artifacts from a target system to generate a fingerprint for the target system which can be used to identify an entity. A technique for generating a fingerprint for a computing system from extracted and classified artifacts is described in commonly-owned application having Ser. No. 17/825,563, entitled "FINGERPRINT GENERATION FOR COMPUTING SYSTEM" and filed on May 26, 2022, the contents of which are incorporated by reference herein as if set forth fully herein. The system may also work with a central system that includes modules for performing security assessment of a computing system and that is described in commonly-owned application having Ser. No. 17/825,166, entitled "CENTRAL SYSTEM FOR COMPUTER SYSTEM SECURITY ASSESSMENT" and filed on May 26, 2022, the contents of which are incorporated by reference herein as if set forth fully herein. One way that an entity having an unknown protocol may be identified is that the infrastructure or scanning system identifies an entity that is acting in a manner that is of interest, for example, the entity may be acting maliciously, acting in a manner that represents a threat, or otherwise producing a significant influence on a system.

The scanning system or infrastructure may obtain a piece corresponding to the entity, for example, a portion of the unknown network communication protocol, a sample or samples of software corresponding to the entity, or the like. The piece may be any part or parts of the entity that assist in learning more about the entity and, specifically for the purposes of the scanning module, more about the network communications protocol being used by the entity. Through reverse engineering the piece or pieces that are obtained, enough of the protocol can be identified to allow the scanning module to emulate the protocol enough to elicit a response from the target entity and identify the entity as one that is utilizing the protocol to communicate. As indicated further herein, the system may actually learn more of the protocol than is needed to elicit a response from a target entity. Thus, from the piece of the entity, the scanning system can generate at least a portion of the unknown network communication protocol to be used while transmitting messages on the communication ports. It should be noted that protocols are generally the same between families of entities. Thus, once the scanning system learns the protocol it can use the protocol to not only identify the specific target entity, but also to identify other target entities within the same family of entities. However, if needed, the system could learn a protocol for each and every target entity.

At 302 the scanning system listens for a response to the message transmitted at 301. In other words, the scanning system, at 302, receives a response to the message from an entity accessing one of the communication ports. For example, if the message was a question, the received response may be an answer to the question. As another example, if the message was a request, the received response may be fulfillment or acknowledgement of the request. Other responses may be received, for example, return questions, messages, and other response types that may or may not be actually responsive to the transmitted message.

At 303 the scanning system determines if the entity is an entity of interest. An entity of interest is an entity that not only provides a response to the message, but provides a response that is actually responsive to the message. Additionally, the entity of interest provides a response using the network communications protocol. Thus, to determine if the entity is an entity of interest, the scanning system analyzes the response to determine if it utilizes the network communications protocol. Additionally, the scanning system analyzes the response to determine if it is responsive to the message transmitted at 301. This determination may be a quick determination to narrow down entities that are communicating on communication ports to entities that are actually entities of interest. However, depending on the message and response it is possible that an entity could provide a response that appears to be responsive and use the network communications protocol, but is not actually an entity that is malicious or a target entity. Thus, the scanning system may perform an additional validation on the entities. This is discussed in more detail further herein.

If the entity is not an entity of interest, the scanning system may ignore the entity at 305. In other words, the scanning system may take no action with respect to the entity. The response by the entity may also be recorded so that is may later be accessed. For example, it may be useful to revisit previously accessed or probed entities if a protocol changes, a new protocol is discovered, and/or any other change that may cause the previously probed entity to possibly now be an entity of interest.

If, on the other hand, the entity is an entity of interest, the entity is added to a group of entities of interest at 304. Since the scanning system has performed an initial quick analysis, some entities included in the group of entities of interest may not actually be target entities. In some cases, the message and response pair may be enough to identify entities of interest, but are not enough to definitively identify the entity as a target entity. For example, a message may be transmitted such that an entity could accidentally correctly respond to the message, but not actually be a target entity, meaning the entity does not communicate using the network communication protocol, but rather accidentally communicated using the network communication protocol.

Accordingly, when adding the entity to the group of entities of interest, or determining whether the entity is an entity of interest, the scanning system may assign a confidence value to the determination or the entity. The confidence value provides an indication of how certain the scanning system is that the entity is a target entity. Confidence values below a predetermined threshold, which may be a default value, set by a user, learned by the scanning system, or the like, indicate that the entity included in the group of entities of interest needs to be further evaluated or validated to ensure that it is indeed a target entity. Entities having a confidence value above meeting or above the predetermined threshold may need no further evaluation or validation, as the scanning system has determined that the entity included in the group of entities of interest is a target entity. Thus, the group of entities may act as a candidate list that includes entities that are candidates to be target entities.

To validate the entity of interest as a target entity, the scanning system may perform additional processing on the entity. The additional processing may include further communications between the scanning system and the entity to ensure that the entity actually communicates utilizing the network communication protocol. The additional processing may also include probing the entity further and/or obtaining additional information about the entity. The additional probing and/or additional information may be utilized by the scanning system to change the confidence value previously assigned to the entity. As the confidence value increases or decreases, the scanning system can take additional action. For example, if the scanning system determines that the entity is not a target entity, the entity can be removed from the list of entities of interest. On the other hand, if the confidence value corresponding to the entity being a target entity increases past the predetermined threshold, then the scanning system identifies the entity as a target entity and moves to the next entity that needs validation. It should be noted that further processing may occur on entities of interest and or target entities to learn more information about the entities. However, this further processing will likely be performed by a different system or infrastructure than the scanning system.

Once the target entities have been identified, the scanning system may provide a list of the entities to a user. The scanning system may also provide the group of entities of interest to a user. The scanning system may also identify or label each target entity with a label indicating the type of entity that the target entity has been identified as. Example entity type labels include, but are not limited to, malicious, probing, influencing, threatening, and the like. The entity label may be identified from the type of communications that are performed by the target entity. A target entity that is attempting to launch an attack may present different communications than a target entity that is attempting to probe a system. The list may also include any additional information that is known about a target entity, for example, a communication time and port, an origination of the communication, a controller identification, and the like.

From the list a user can take a variety of actions, for example, blocking the IP communications from the entity, blacklisting the target entity, using the information to access the target entity, and the like. The action performed by a user will be based upon the function and purpose of the user requesting the information. For example, some users may want to learn more information about the target entity, whereas other users may want to completely block communications from the target entity. Nonetheless, after the list is provided to the user, the scanning system can perform additional scans for new target entities. It should also be noted that target entities may not be identified as soon as they start communicating with a system. Accordingly, the described scanning system allows for searching of historical scan records that would allow a user or scanning system to identify previous times that a target entity communicated with the system.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for discovering an entity communicating using a network communication protocol, the method comprising:
   identifying, utilizing a scanning system, a target entity accessing at least one of a plurality of communication ports;
   obtaining, utilizing the scanning system, a piece of the target entity, wherein the piece comprises a portion of the target entity related to a protocol utilized by the target entity;
   generating, utilizing the scanning system and from the piece of the target entity, at least a portion of the protocol; and transmitting, at the at least one of a plurality of communication ports and utilizing the scanning system, a message using the at least a portion of the protocol, wherein the message is formatted in view of and utilizes a language of the protocol to elicit a response from the target entity, wherein the transmitting comprises emulating a portion of the protocol, wherein the formatting comprises configuring portions of the message to match the protocol, wherein the portion emulated comprises an amount of the protocol that is enough to elicit the response from the target entity and is less than an entirety of the protocol.

2. The method of claim 1, wherein the identifying a target entity comprises identifying the target entity is producing an influence on a computing system.

3. The method of claim 1, further comprising
receiving, at the scanning system, a response to the message from the target entity; and
adding the target entity to a group of entities of interest.

4. The method of claim 1, wherein the protocol comprises an unknown protocol.

5. The method of claim 1, wherein the piece comprises at least one of: a portion of the protocol and samples of software corresponding to the entity.

6. The method of claim 1, wherein the transmitting comprises emulating a question using the protocol and wherein the receiving a response comprises receiving an answer to the question from the entity using the protocol.

7. The method of claim 1, further comprising validating that the entity utilizes the protocol responsive to adding the entity to the group.

8. The method of claim 1, wherein the protocol comprises a custom protocol unique to a family of entities.

9. The method of claim 1, wherein the transmitting is performed in view of user-provided communication parameters.

10. The method of claim 1, further comprising labeling the target entity as an entity type based upon a type of communications performed by the target entity.

11. A system for discovering an entity communicating using a network communication protocol, the system comprising:
a scanning system;
a processor operatively coupled to the scanning system;
a memory device that stores instructions that, when executed by the processor, causes the system to:
identify, utilizing the scanning system, a target entity accessing at least one of a plurality of communication ports;
obtain, utilizing the scanning system, a piece of the target entity, wherein the piece comprises a portion of the target entity related to a protocol utilized by the target entity;
generate, utilizing the scanning system and from the piece of the target entity, at least a portion of the protocol; and
transmit, at the at least one of a plurality of communication ports and utilizing the scanning system, a message using the at least a portion of the protocol, wherein the message is formatted in view of and utilizes a language of the protocol to elicit a response from the target entity, wherein the transmitting comprises emulating a portion of the protocol, wherein the formatting comprises configuring portions of the message to match the protocol, wherein the portion emulated comprises an amount of the protocol that is enough to elicit the response from the target entity and is less than an entirety of the protocol.

12. The system of claim 11, wherein the identifying a target entity comprises identifying the target entity is producing an influence on a computing system.

13. The system of claim 11, further comprising
receiving, at the scanning system, a response to the message from the target entity; and
adding the target entity to a group of entities of interest.

14. The system of claim 11, wherein the protocol comprises an unknown protocol.

15. The system of claim 11, wherein the piece comprises at least one of: a portion of the protocol and samples of software corresponding to the entity.

16. The system of claim 11, wherein the transmitting comprises emulating a question using the protocol and wherein the receiving a response comprises receiving an answer to the question from the entity using the protocol.

17. The system of claim 11, further comprising validating that the entity utilizes the protocol responsive to adding the entity to the group.

18. The system of claim 11, wherein the protocol comprises a custom protocol unique to a family of entities.

19. The system of claim 11, wherein the transmitting is performed in view of user-provided communication parameters.

20. A product for discovering an entity communicating using a network communication protocol, the product comprising:
a computer-readable storage device that stores executable code that, when executed by a processor, causes the product to:
identify, utilizing a scanning system, a target entity accessing at least one of a plurality of communication ports;
obtain, utilizing the scanning system, a piece of the target entity, wherein the piece comprises a portion of the target entity related to a protocol utilized by the target entity;
generate, utilizing the scanning system and from the piece of the target entity, at least a portion of the protocol; and
transmit, at the at least one of a plurality of communication ports and utilizing the scanning system, a message using the at least a portion of the protocol, wherein the message is formatted in view of and utilizes a language of the protocol to elicit a response from the target entity, wherein the transmitting comprises emulating a portion of the protocol, wherein the formatting comprises configuring portions of the message to match the protocol, wherein the portion emulated comprises an amount of the protocol that is enough to elicit the response from the target entity and is less than an entirety of the protocol.

* * * * *